(12) United States Patent
Demolliens et al.

(10) Patent No.: US 10,890,376 B2
(45) Date of Patent: Jan. 12, 2021

(54) METHOD AND APPARATUS FOR SEPARATING A SYNTHESIS GAS

(71) Applicant: L'Air Liquide, Societe Anonyme pour l'Etude et l'Exploitation des Procedes Georges Claude, Paris (FR)

(72) Inventors: Bertrand Demolliens, Paris (FR); Antoine Hernandez, Pontault Combault (FR); Jean-Marc Tsevery, Lieusaint (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 241 days.

(21) Appl. No.: 15/772,280

(22) PCT Filed: Oct. 28, 2016

(86) PCT No.: PCT/FR2016/052809
§ 371 (c)(1),
(2) Date: Apr. 30, 2018

(87) PCT Pub. No.: WO2017/072462
PCT Pub. Date: May 4, 2017

(65) Prior Publication Data
US 2018/0320959 A1    Nov. 8, 2018

Related U.S. Application Data

(60) Provisional application No. 62/248,508, filed on Oct. 30, 2015.

(30) Foreign Application Priority Data

Jul. 25, 2016    (FR) ...................... 16 57108

(51) Int. Cl.
*F25J 3/02* (2006.01)
*C01B 32/40* (2017.01)
*C01B 3/50* (2006.01)

(52) U.S. Cl.
CPC ............. *F25J 3/0223* (2013.01); *C01B 3/506* (2013.01); *C01B 32/40* (2017.08); *F25J 3/0252* (2013.01);
(Continued)

(58) Field of Classification Search
CPC ........ F25J 3/0233; F25J 3/0261; F25J 3/0271; F25J 2210/04; F25J 2220/02;
(Continued)

(56) References Cited

U.S. PATENT DOCUMENTS 4,566,886 A * 1/1986 Fabian .................... C01B 3/506
62/619
2011/0130883 A1* 6/2011 Van Dijk ............... F25J 3/0209
700/282

(Continued)

FOREIGN PATENT DOCUMENTS

DE    10 2007 027819    12/2008
DE    10 2007 059543    6/2009
(Continued)

OTHER PUBLICATIONS

International Search Report and Written Opinion for PCT/FR2016/052809, dated Mar. 14, 2017.

*Primary Examiner* — Frantz F Jules
*Assistant Examiner* — Erik Mendoza-Wilkenfel
(74) *Attorney, Agent, or Firm* — Justin K. Murray (57) ABSTRACT

In a method for separating a synthesis gas containing carbon monoxide and hydrogen, a synthesis gas flow from a synthesis gas source is compressed in a compressor and separated into at least three gaseous products. If there is insuf-
(Continued)

ficient synthesis gas, at least three separation products are recycled in the compressor in order to separate said products.

12 Claims, 3 Drawing Sheets

(52) U.S. Cl.
CPC .......... *F25J 3/0261* (2013.01); *F25J 3/0295* (2013.01); *C01B 2203/043* (2013.01); *C01B 2203/046* (2013.01); *C01B 2203/047* (2013.01); *C01B 2203/048* (2013.01); *C01B 2203/0475* (2013.01); *C01B 2203/0495* (2013.01); *C01B 2203/146* (2013.01); *C01B 2210/007* (2013.01); *C01B 2210/0009* (2013.01); *C01B 2210/0051* (2013.01); *C01B 2210/0053* (2013.01); *C01B 2210/0062* (2013.01); *F25J 2205/40* (2013.01); *F25J 2205/60* (2013.01); *F25J 2210/02* (2013.01); *F25J 2210/04* (2013.01); *F25J 2210/06* (2013.01); *F25J 2210/18* (2013.01); *F25J 2210/42* (2013.01); *F25J 2210/60* (2013.01); *F25J 2220/02* (2013.01); *F25J 2230/30* (2013.01); *F25J 2230/32* (2013.01); *F25J 2245/02* (2013.01); *F25J 2250/30* (2013.01); *F25J 2280/02* (2013.01); *F25J 2280/20* (2013.01); *F25J 2290/62* (2013.01)

(58) Field of Classification Search
CPC .. F25J 2280/02; F25J 2280/10; F25J 2280/20; F25J 2280/30; F25J 2280/50; F25J 2245/02; C01B 32/40; C01B 3/506
See application file for complete search history.

(56) References Cited

U.S. PATENT DOCUMENTS

| | | | |
|---|---|---|---|
| 2013/0047665 A1* | 2/2013 | Genkin | F25J 3/0252 62/617 |
| 2013/0102693 A1* | 4/2013 | Kibby | B01J 23/8913 518/715 |
| 2013/0118205 A1* | 5/2013 | Forsyth | F25J 3/08 62/617 |
| 2016/0054055 A1* | 2/2016 | Patel | C10G 70/043 62/621 |

FOREIGN PATENT DOCUMENTS

| | | |
|---|---|---|
| EP | 1 479 990 | 11/2004 |
| EP | 2 565 154 | 3/2013 |
| FR | 2 838 424 | 10/2003 |
| FR | 2 861 165 | 4/2005 |
| FR | 2 969 136 | 6/2012 |
| WO | WO 2012/076786 | 6/2012 |
| WO | WO 2014/012629 | 1/2014 |

* cited by examiner

METHOD AND APPARATUS FOR SEPARATING A SYNTHESIS GAS

CROSS REFERENCE TO RELATED APPLICATIONS

This application is a § 371 of International PCT Application PCT/FR2016/052809, filed Oct. 28, 2016, which claims the benefit of FR1657108, filed Jul. 25, 2016 and U.S. Provisional Application 62/248,508, filed Oct. 30, 2015, all of which are herein incorporated by reference in their entireties.

TECHNICAL FIELD OF THE INVENTION

The present invention relates to a method and apparatus for separating a synthesis gas. In particular, the synthesis gas comprises carbon monoxide and hydrogen and possibly methane and/or nitrogen.

BACKGROUND OF THE INVENTION

A cryogenic distillation apparatus is fed with synthesis gas by a synthesis gas generating unit of the reforming and/or partial oxidation type (SMR, ATR, PDX, . . . ). The synthesis gas leaving the generating unit is cooled (possibly by means of cooling water, to produce steam and various preheated materials), then passed to a $CO_2$ extraction system (typically by scrubbing with amines such as MEA, MDEA, aMDEA), then dried before being passed to the cryogenic distillation apparatus for separation and purification of the CO. In some cases, particularly when the synthesis gas is produced by a partial oxidation generation unit producing acetylene, the residual gas, known in English as AOG or "acetylene offgas", comprises the synthesis gas. It is compressed with a compressor upstream of the cryogenic distillation apparatus. The pressure at which this gas is compressed is compatible with the pressure of the required hydrogen-rich product. Thus it is not essential for the hydrogen to be recompressed before being transferred to the customer.

Generally, when the unit consuming CO is operated with a low throughput, the synthesis-gas-generating part only delivers the CO molecules required (so as not to adversely affect operating costs and as far as possible to avoid flaring surplus CO and/or $H_2$ products). The cryogenic distillation apparatus will operate under low throughput conditions, expressed as the ratio of CO and/or $H_2$ flow to nominal throughputs. Thus the operating stability of the cryogenic distillation apparatus at low throughput causes a problem in the long term, with increased risks that it will fail to meet the required purity for the CO or produce excessively fluctuating production flows. To ensure that the cryogenic distillation apparatus operates stably it must be operated with a sufficient charging flow, which may be greater than customers' needs at the time. Operating costs deteriorate because the cryogenic distillation apparatus has to be operated at a charging level greater than customers' needs.

When the synthesis gas generating unit is shut down prematurely, this shuts down the cryogenic distillation apparatus, which no longer receives any feed of synthesis gas molecules. When the synthesis gas is again available, a certain length of time (of the order of several hours) is required for restarting before it is possible to again produce CO of the required purity.

Thus shut-down of the synthesis gas generating unit for a few minutes will result in a break of several hours in the production in CO. Downstream customers will in turn have to shut down their CO consuming facilities, and these in turn will have to be restarted.

SUMMARY OF THE INVENTION

The technical solution described below, namely recycling of fluids produced by the cryogenic distillation apparatus to the feed to that apparatus (functioning for example by scrubbing with methane and/or partial condensation and/or scrubbing with carbon monoxide) when the unit generating the synthesis gas is operating at low throughput or is shut down, thus makes it possible to prevent long shut-downs of an industrial facility which would give rise to high non-production costs.

When producing carbon monoxide and hydrogen from a synthesis gas generated by reforming or partial oxidation, a cryogenic distillation apparatus and an adsorption unit are generally used. The cryogenic distillation apparatus purifies the CO and produces a hydrogen-enriched flow, from which hydrogen is then removed by adsorption.

The proposed solution is to recycle the gases produced by the cryogenic distillation apparatus, possibly all the gases produced by the cryogenic distillation apparatus, upstream of the cryogenic distillation apparatus. Thus the separation units will not be shut down and when the source generating synthesis gas comes back on stream it will be possible to again process the synthesis gas and produce the products required. This solution will also make it possible to reduce the load from the source down to 0% without shut-down, instead of the typical 40%.

As claimed in one object of the invention, provision is made for a method for separating a synthesis gas containing carbon monoxide and hydrogen wherein i) a synthesis gas flow originating from a synthesis gas source is compressed in a compressor ii) the compressed synthesis gas is purified in a purification unit to remove water and carbon monoxide iii) the compressed purified synthesis gas flow is cooled iv) the cooled synthesis gas flow is separated by scrubbing and/or distillation at a cryogenic temperature and possibly by adsorption in a separation unit, and v) at least the following three gases are produced in the separation unit: a carbon monoxide-enriched gas, a hydrogen-enriched gas, a residual gas containing carbon monoxide and hydrogen which contains less carbon monoxide than the carbon-monoxide-enriched gas and less hydrogen than the hydrogen-enriched gas and possibly also a methane-enriched gas, and/or a nitrogen-enriched gas, characterized in that only if the synthesis gas flow passed to the compressor is below a threshold or zero, at least a portion of at least two or even each of the following three gases: the carbon monoxide-enriched gas, the hydrogen-enriched gas and the residual gas containing carbon monoxide and hydrogen, is passed downstream of the source, and possibly upstream of the compressor, to be purified in the purification unit and separated in the separation unit.

As claimed in another aspect of the invention, in the method:

a) the compressed synthesis gas is stored while the flow of synthesis gas is above the threshold and b) at least a portion of the compressed synthesis gas and at least a portion of at least each of the first three gases from stage v) are passed downstream of the source, and possibly upstream of the compressor, to be purified in the purification unit and separated in the separation unit.

As claimed in other optional aspects of the invention:
at least a portion of at least each of the first three gases from stage v) downstream of the source and possibly upstream of the compressor only if the flow of synthesis gas is below the threshold, or if no flow comes from the source.
during nominal operation of the method, the outputs from the separation unit are nominal outputs
i) x % of the nominal output of the carbon monoxide-enriched gas and y % of the nominal output of the hydrogen-enriched gas are passed to the separation unit (16, 21, 41) when the flow of synthesis gas is below a threshold, x and y differing by at most 5% and/or)
ii°) y % of the nominal output of the hydrogen-enriched gas and z % of the nominal output of the residual gas are passed to the separation unit (16, 21, 41) when the flow of synthesis gas is below a threshold, y and z differing by at most 5% and/or
iii) x % of the nominal output of the carbon monoxide-enriched gas and z % of the nominal output of the residual gas are passed to the separation unit (16, 21, 41) when the flow of synthesis gas is below a threshold, x and z differing by at most 5%
only x % of the nominal output of the carbon monoxide-enriched gas, y % of the nominal output of the hydrogen-enriched gas and z % of the nominal output of the residual gas are passed to the separation unit when the flow of synthesis gas is below a threshold, x, y and z differing by at most 5%
a portion of the carbon monoxide-enriched gas is stored in a storage unit
and the rest of the carbon monoxide-enriched gas is passed to a customer if the flow of synthesis gas is above the threshold and the carbon monoxide-enriched gas originating from the storage unit is passed to the customer if the flow of synthesis gas is below the threshold
if the flow of synthesis gas is below the threshold, all the carbon monoxide-enriched gas passed to the customer originates from the storage unit and possibly all the carbon monoxide-enriched gas originating directly from the separation unit without passing through the storage unit is passed upstream of the compressor and downstream of the source
the synthesis gas is a residual gas from an acetylene production unit
if the flow of synthesis gas is above the threshold, a portion of the synthesis gas is stored in a storage unit and if the flow of synthesis gas is below the threshold, the synthesis gas is passed from the storage unit to the compressor
if the synthesis gas flow is zero, the separation unit is fed only by gases produced by the separation unit
the carbon monoxide-enriched gas is compressed in a product compressor and passed to the customer and, if the flow of synthesis gas is below the threshold and the carbon monoxide-enriched gas flow which has to be compressed is below another threshold, nitrogen gas is passed to the product compressor to be compressed with the carbon monoxide-enriched gas
if the flow of synthesis gas is below a threshold, a gas rich in a component of the synthesis gas originating from a source other than the separation apparatus is passed to the separation unit
the carbon monoxide-enriched gas is compressed in a compressor, then divided into two, a compressed portion serving as product and a compressed portion being recycled downstream of the source and/or the hydrogen-enriched gas is compressed in a compressor, then divided into two, a compressed portion serving as product and a compressed portion being recycled downstream of the source.

As claimed in another object of the invention, provision is made for an apparatus for separating a synthesis gas containing carbon monoxide and hydrogen comprising a compressor to compress a synthesis gas flow originating from a source of synthesis gas, a purification unit to remove water and/or carbon dioxide from the compressed synthesis gas, means for cooling the flow of compressed purified synthesis gas, a unit for separating the cooled synthesis gas flow by scrubbing and/or distillation at a cryogenic temperature possibly comprising an adsorption unit, means for producing at least the following three gases from the separation unit: a carbon monoxide-enriched gas, a hydrogen-enriched gas, a residual gas containing carbon monoxide and hydrogen which contains less carbon monoxide than the carbon monoxide-enriched gas and less hydrogen than the hydrogen-enriched gas and possibly also a methane-enriched gas, and/or a nitrogen-enriched gas, means for passing at least a portion of at least two or even each of the following three gases: the carbon monoxide-enriched gas, the hydrogen-enriched gas and the residual gas containing carbon monoxide and hydrogen downstream from the source, and possibly upstream of the compressor, to be purified in the purification unit and separated in the separation unit, and means for initiating the return of at least a portion of the at least two gases as claimed in the flow of synthesis gas originating from the source upstream of the compressor.

As claimed in other optional aspects the apparatus comprises:
a storage unit downstream of the compressor and upstream of the purification unit, this storage unit being connected to the feed pipe of the compressor by means which do not pass through the compressor.
means for passing gas from the storage unit upstream of the compressor as claimed in the flow of synthesis gas originating from the source upstream of the compressor.

In particular, in the case where the synthesis gas is compressed upstream of the cryogenic distillation apparatus by a compressor (as for example when the synthesis gas comprises a residual flow (that known as "acetylene offgas") from a unit producing acetylene), the synthesis gas compressor is used to recycle the fluids produced by the cryogenic distillation apparatus so that:
1) a sufficient flow is maintained to the cryogenic distillation apparatus as a supplement to the synthesis gas flow produced by the upstream unit and sufficient to produce a CO flow which is less than the technical minimum for the cryogenic distillation apparatus
2) the cryogenic distillation apparatus is kept in operation even when the unit producing synthesis gas is shut down; in this case the cryogenic distillation apparatus will be fed with only recycled gases until such time as the synthesis gas produced by the upstream unit is again available
To ensure that the customer is supplied with CO during the time when synthesis gas is not available a liquid storage unit for CO molecules is added to the cryogenic distillation apparatus. This CO will be vaporized while the feed from the cryogenic distillation apparatus is cut off.
A CO gas buffer storage unit may be added to compensate for the vaporization start-up time. In fact, the gases produced by the cryogenic distillation apparatus will then be recycled and the gas required by the customer will then originate from this buffer storage unit installed upstream of the control valve on the CO production line and will be operated at a pressure above the pressure required by the unit consuming the CO.

A high pressure buffer storage unit which is fed by the output from the AOG compressor and which will be connected to the suction side of the compressor may be added to compensate for the time when the valves in the recycling pipes open. This buffer storage unit may then compensate for the first few seconds of the transitional situation while the valve is closing and also the very small leaks from the compressor and/or the $CO_2$ extraction system.

Nitrogen may possibly be injected into the suction side of the CO compressor to balance out the leaks from the compressor. Nevertheless it is preferable that losses from the CO compressor be compensated for by topping-up with external molecules originating from a CO gas buffer storage unit from the CO liquid storage unit.

Adding nitrogen in fact degrades the quality of the CO produced.

These ideas in combination mean that a production flow of CO to the customer can always be maintained, even during short-term shut-downs of the synthesis gas generating unit, and thus makes the facility reliable for the end customer by smoothing over breaks in supply from the synthesis gas generating facility.

BRIEF DESCRIPTION OF THE DRAWINGS

The present invention will be clearly understood and its advantages will arise from the description which follows, given merely as a non-limitative example, and with reference to the attached drawings in which.

DETAILED DESCRIPTION

Figure 1:
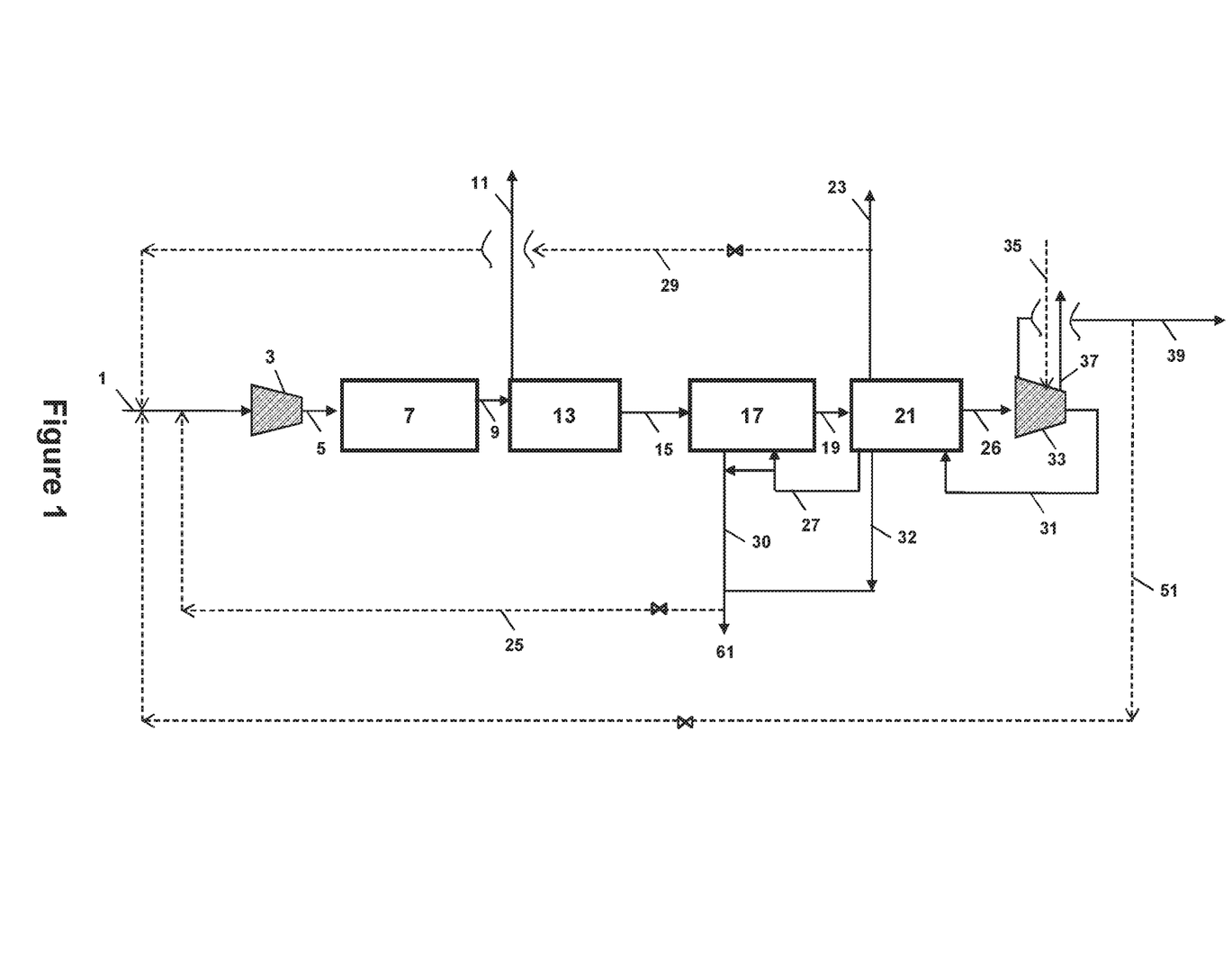
FIG. 1 provides a first embodiment of the present invention.

In FIG. 1, a synthesis gas 1 originates from a synthesis gas generating unit, for example a reforming unit such as an SMR or an ATR or partial oxidation unit, which produces for example acetylene. The synthesis gas 1 contains carbon monoxide, carbon dioxide, hydrogen and possibly methane and nitrogen.

The gas 1 is compressed by a compressor 3 to form a compressed gas 5. The compressed gas 5 is passed to a hydrogenation treatment unit 7 to remove oxygen and unsaturated hydrocarbons, producing a flow 9. The flow 9 is passed to a $CO_2$ extraction unit 13, for example by scrubbing with amines, producing a purge flow rich in $CO_2$ 11 and a synthesis gas flow impoverished in $CO_2$ 15. The flow 15 is passed to a unit 17 for the removal of $CO_2$ by adsorption to remove the remaining $CO_2$. The synthesis gas from which $CO_2$ has been removed 19 is passed to a cryogenic distillation unit 21 where the synthesis gas is cooled and then separated in at least one distillation column, comprising for example a stage of methane scrubbing and/or partial condensation and/or scrubbing with carbon monoxide. The cryogenic distillation unit 21 produces a gas flow enriched in carbon monoxide 26, a gas rich in hydrogen 27 and a residual gas 23 containing carbon monoxide and hydrogen, which contains less carbon monoxide than the gas 26 and less hydrogen than the gas 27. The carbon monoxide-enriched gas flow 26 is compressed in a compressor 33. A gas flow 31 from the outlet of the compressor 33 is returned to the cryogenic distillation unit 21. The flow 37 represents losses of carbon monoxide-enriched gas from the compressor 33. The gas coming from an intermediate stage of the compressor 33 partly forms a product 39.

If the synthesis gas flow originating from the synthesis gas source is zero, all these three products 23, 27, 39 are returned to purification. The hydrogen and the residual gas need to be compressed in the compressor 3, but the carbon monoxide can be compressed to the pressure required in the compressor 33 and recycled downstream of the compressor 3. Thus the gases 23 and 27 need to be passed upstream of the compressor 3 whereas the gas 26 can be recycled upstream or downstream of the compressor 3.

While the method is in nominal operation the outputs from the separation unit are nominal outputs.

When operating with low or zero synthesis gas production, i) x % of the nominal output of the carbon monoxide-enriched gas and y % of the nominal output of the hydrogen-enriched gas are passed to the separation unit (16, 21, 41) when the flow of synthesis gas is below a threshold, x and y differing by at most 5% and/or ii) y % of the nominal output of the hydrogen-enriched gas and z % of the nominal output of the residual gas are passed to the separation unit (16, 21, 41) when the flow of synthesis gas is below a threshold, y and z differing by at most 5% and/or iii) x % of the nominal output of the carbon monoxide-enriched gas and z % of the nominal output of the residual gas are passed to the separation unit (16, 21, 41) when the flow of synthesis gas is below a threshold, x and z differing by at most 5%.

For example, if the synthesis gas flow is not zero but is less than a threshold, a percentage of x % of the carbon monoxide-enriched gas, y % of the hydrogen-enriched gas and z % of the residual gas may be passed to the purification unit and then to cryogenic separation. Percentages x, y and z are preferably the same, but may differ by less than 5%.

When at least a portion of the carbon monoxide from the compressor 33 is recycled, nitrogen gas 35 may be injected at an intermediate level or at the suction side of the compressor 33 to compensate for leaks from the compressor.

Figure 2:
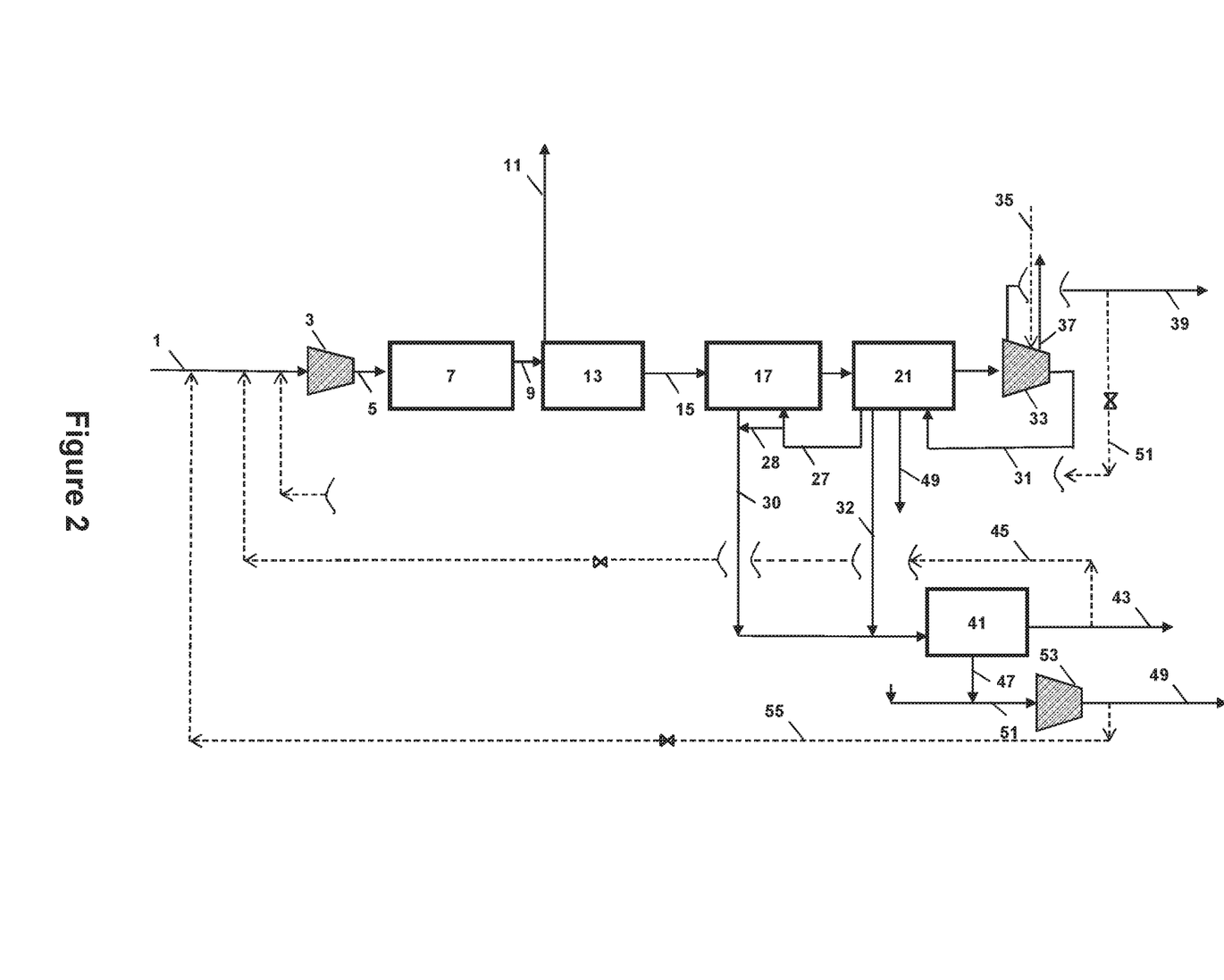
FIG. 2 provides a second embodiment of the present invention.

FIG. 2 differs from FIG. 1 in that hydrogen-enriched flow 30 is passed from adsorption unit 17 which removes water and $CO_2$ to an adsorption purification apparatus 41. This apparatus 41 produces a hydrogen-enriched gas 43. Hydrogen-impoverished gas 47 from apparatus 41 is mixed with the residue 49 from apparatus 21 and compressed in a compressor 53 to provide a pressurized residual gas.

Thus, if synthesis gas 1 is no longer produced or is produced in small quantity, at least some products from the cryogenic distillation apparatus 21 are recycled upstream of the compressor 3, possibly after an additional treatment stage. In addition to the rest 51 of the gas from the intermediate stage of the compressor 33 or instead of the gas 51 at least a portion 45 of the hydrogen-enriched product 43 and/or at least a portion 55 of the residual gas originating from the compressor 53 can be recycled upstream of the compressor 3.

Figure 3:
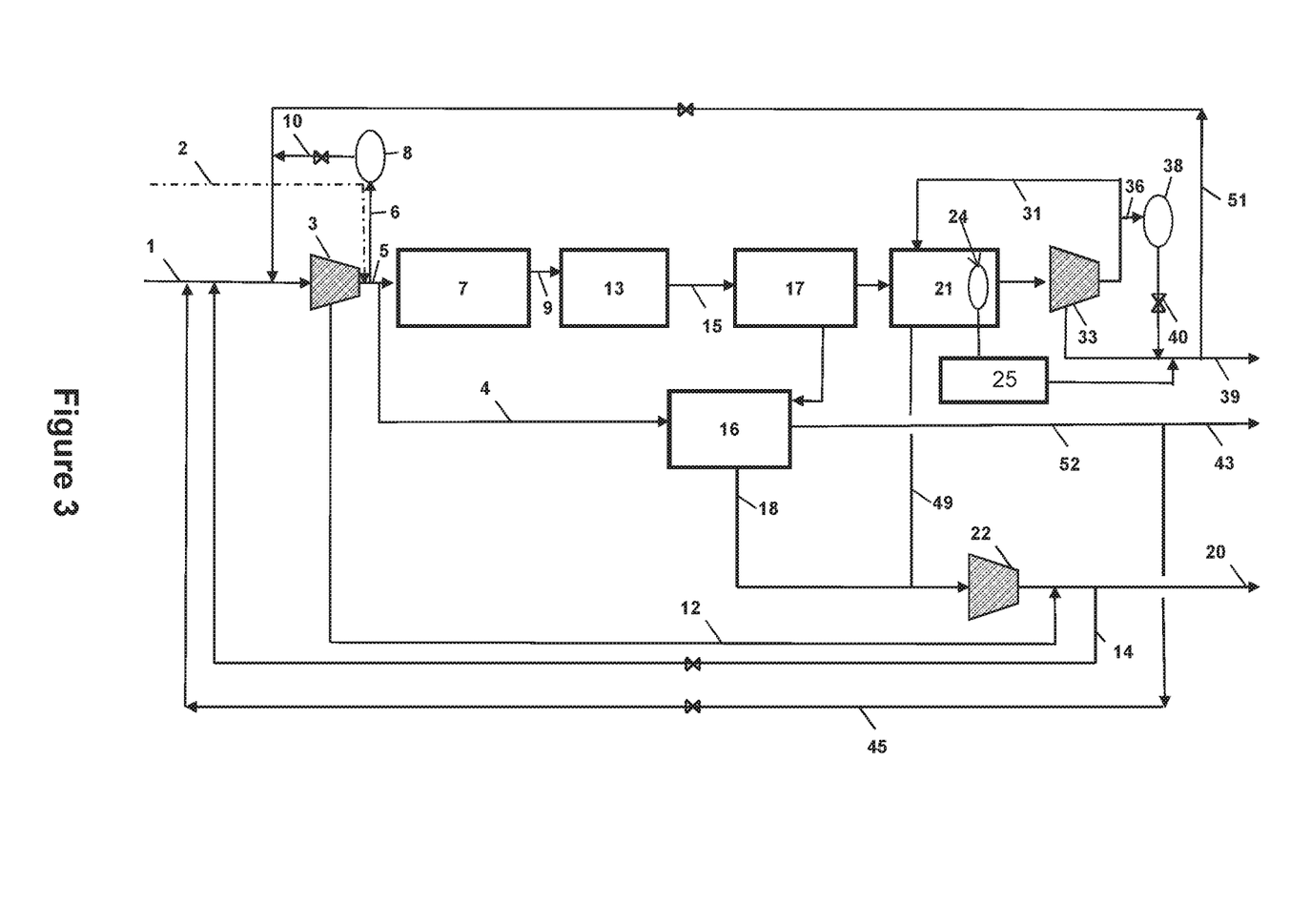
FIG. 3 provides a third embodiment of the present invention.

FIG. 3 differs from FIG. 1 in that a portion 4 of the synthesis gas is drawn off from the compressor 3 at an intermediate pressure for portion 4 and at the final pressure of the latter for portion 4 and are not processed in units 7, 13, 17, 21. Portion 4 is sent at the final pressure of the compressor 3 to an adsorption separation unit 16 called PSA where it is purified to form a hydrogen-enriched flow 52. Residue 18 from the adsorption separation unit 16 which is hydrogen-impoverished is mixed with the residual gas 49 from the cryogenic apparatus 21 and the mixture is compressed in a compressor 22 to form a gaseous fuel 20. Synthesis gas portion 12 can be mixed with the gaseous fuel 20.

If the synthesis gas 1 is no longer produced or is produced in a small quantity below a threshold, at least the following three gases are recycled downstream of the synthesis gas source and possibly upstream of the compressor 3:

i) at least a portion 51 of the carbon monoxide-enriched gas 39 originating from the cryogenic distillation apparatus 21 ii) at least a portion 45 of the hydrogen-enriched gas originating from the adsorption separation unit 16 iii) at least a portion 14 of a residual gas containing hydrogen and/or carbon monoxide originating from the cryogenic distillation apparatus and/or the adsorption separation unit 16, which contains less carbon monoxide than the gas 51 and less hydrogen than the gas 45, and possibly also iv) a portion 6 of the compressed synthesis gas drawn off downstream of the compressor 3, stored in a storage unit 8 while the flow of synthesis gas is above the threshold and returned via the pipe 10 and a valve.

Preferably the percentages of recycled gases will differ little in order to reconstitute the synthesis gas by mixing the various products 45, 51, 14.

To ensure that there is sufficient carbon monoxide for the customer, a liquid carbon monoxide storage unit 24 within the distillation apparatus 21 and/or a gaseous carbon monoxide storage unit 38 fed from the compressor 33 by the pipe 36 can be used to supply the shortfall of carbon monoxide. The liquid from the storage unit 24 is vaporized in the vaporizer 25.

In particular, if most or all the carbon monoxide produced in real time is intended for recycling, the carbon monoxide stored in the storage units 24 or 38 can be used to supply the customer. Thus for example valve 40 will be opened to supply carbon monoxide from storage unit 38 to the customer if synthesis gas 1 falls short.

In a preferred variant, which may be used in all the methods as claimed in FIGS. 1 to 3 using the pipes present and adding the required storage units, recycling can be carried out as follows.

Initially the synthesis gas flow falls below a threshold or stops. First of all a start is made on opening the recycling valves for at least two fluids produced while processing the synthesis gas. The synthesis gas is recycled from the storage unit 8 (or the pipe downstream of the compressor 3 if its volume and pressure permit) upstream of the compressor 3. Once the recycling valves are open, at least the following three gases are recycled downstream of the synthesis gas source and possibly upstream of the compressor 3:

i) at least a portion 51 of the carbon monoxide-enriched gas 39 originating from the cryogenic distillation apparatus 21 ii) at least a portion 45 of the hydrogen-enriched gas originating from the adsorption separation unit 16 iii) at least a portion 14 of a residual gas containing hydrogen and/or carbon monoxide originating from the cryogenic distillation apparatus and/or the adsorption separation unit 16, which contains less carbon monoxide than the gas 51 and less hydrogen than the gas 45, and possibly also iv) a portion 6 of the compressed synthesis gas drawn off downstream of the compressor 3, stored in a storage unit 8 while the flow of synthesis gas is above the threshold and returned via the pipe 10 and a valve.

In some cases all the output from the separation apparatus comprising the scrubbing separation apparatus and/or distillation separation apparatus and possibly the adsorption unit is recycled upstream of the synthesis gas compressor.

It is also possible in all the figures that the carbon monoxide-enriched gas 51 may be recycled downstream of the synthesis gas compressor 3. In this case the gas 51 can be drawn off at the outlet pressure from the compressor 3.

It is also possible to recycle at least two products and also to pass a gas 2 rich in a synthesis gas component originating from an external source other than the separation apparatus upstream or downstream of the synthesis gas compressor. This gas 2 may be natural gas from a pipeline or a synthesis gas from another source.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A method for separating a synthesis gas containing carbon monoxide and hydrogen wherein:
   i) compressing a synthesis gas flow originating from a synthesis gas source in a compressor;
   ii) purifying the compressed synthesis gas in a purification unit to remove water and/or carbon dioxide;
   iii) cooling the compressed purified synthesis gas flow;
   iv) separating the cooled synthesis gas flow in a separation unit by a separation process selected from the group consisting of scrubbing, distillation at a cryogenic temperature, adsorption, and combinations thereof, v) producing at least the following three gases in the separation unit: a carbon monoxide-enriched gas, a hydrogen-enriched gas, a residual gas containing carbon monoxide and hydrogen which contains less carbon monoxide than the carbon monoxide-enriched gas and less hydrogen than the hydrogen-enriched gas, and vi) determining that the synthesis gas flow passed to the compressor is below a threshold or zero, and then introducing at least a portion of at least two the gases selected from the group consisting of the carbon monoxide-enriched gas, the hydrogen-enriched gas, the residual gas, and combinations thereof, at a location downstream of the source and upstream of the purification unit, wherein at least a portion of at least each of the three gases from stage v) downstream of the source is introduced downstream of the source and upstream of the compressor only if the flow of synthesis gas is below the threshold, or if none of the flow of the synthesis gas comes from the source.

2. The method as claimed in claim 1, wherein:
a) the compressed synthesis gas is stored while the flow of synthesis gas is above the threshold; and
b) at least a portion of the compressed synthesis gas and at least a portion of at least each of the first three gases from stage v) are passed downstream of the source to be purified in the purification unit and separated in the separation unit while the flow of synthesis gas is below the threshold.

3. The method as claimed in claim 1, wherein
x % of a nominal output of the carbon monoxide-enriched gas and y % of a nominal output of the hydrogen-enriched gas are passed to the separation unit when the flow of synthesis gas is below a threshold, x and y differing by at most 5%; and/or
y % of the nominal output of the hydrogen-enriched gas and z % of the nominal output of the residual gas are passed to the separation unit when the flow of synthesis gas is below a threshold, y and z differing by at most 5%; and/or
x % of the nominal output of the carbon monoxide-enriched gas z % of the nominal output of the residual gas are passed to the separation unit when the flow of synthesis gas is below a threshold, x and z differing by at most 5%.

4. A method for separating a synthesis gas containing carbon monoxide and hydrogen, the method comprising the steps of:
i) compressing a synthesis gas flow originating from a synthesis gas source in a compressor;
ii) purifying the compressed synthesis gas in a purification unit to remove water and/or carbon dioxide;
iii) cooling the compressed purified synthesis gas flow;
iv) separating the cooled synthesis gas flow in a separation unit by a separation process selected from the group consisting of scrubbing, distillation at a cryogenic temperature, adsorption, and combinations thereof;
v) producing at least the following three gases in the separation unit: a carbon monoxide-enriched gas, a hydrogen-enriched gas, a residual gas containing carbon monoxide and hydrogen which contains less carbon monoxide than the carbon monoxide-enriched gas and less hydrogen than the hydrogen-enriched gas, and vi) determining that the synthesis gas flow passed to the compressor is below a threshold or zero, and then introducing at least a portion of at least two the gases selected from the group consisting of the carbon monoxide-enriched gas, the hydrogen-enriched gas, the residual gas, and combinations thereof, at a location downstream of the source and upstream of the purification unit, wherein a portion of the carbon monoxide-enriched gas is stored in a storage unit and the rest of the carbon monoxide-enriched gas is sent to a customer if the flow of synthesis gas is above the threshold and the carbon monoxide-enriched gas originating from the storage unit is sent to the customer if the flow of synthesis gas is below the threshold.

5. The method as claimed in claim 4, wherein if the flow of synthesis gas is below the threshold, all the carbon monoxide-enriched gas passed to the customer originates from the storage unit and possibly all the carbon monoxide-enriched gas originating directly from the separation unit without passing through the storage unit is passed upstream of the compressor and downstream of the source.

6. The method as claimed in claim 1, wherein the synthesis gas is a residual gas from an acetylene production unit.

7. A method for separating a synthesis gas containing carbon monoxide and hydrogen, the method comprising the steps of:
i) compressing a synthesis gas flow originating from a synthesis gas source in a compressor;
ii) purifying the compressed synthesis gas in a purification unit to remove water and/or carbon dioxide;
iii) cooling the compressed purified synthesis gas flow;
iv) separating the cooled synthesis gas flow in a separation unit by a separation process selected from the group consisting of scrubbing, distillation at a cryogenic temperature, adsorption, and combinations thereof;
v) producing at least the following three gases in the separation unit: a carbon monoxide-enriched gas, a hydrogen-enriched gas, a residual gas containing carbon monoxide and hydrogen which contains less carbon monoxide than the carbon monoxide-enriched gas and less hydrogen than the hydrogen-enriched gas, and
determining that the synthesis gas flow passed to the compressor is below a threshold or zero, and then introducing at least a portion of at least two the gases selected from the group consisting of the carbon monoxide-enriched gas, the hydrogen-enriched gas, the residual gas, and combinations thereof, at a location downstream of the source and upstream of the purification unit, wherein if the flow of synthesis gas is above the threshold, a portion of the synthesis gas is stored in a storage unit and if the flow of synthesis gas is below the threshold, the synthesis gas is passed from the storage unit to the compressor.

8. The method as claimed in claim 1, wherein if the synthesis gas flow is zero, the separation unit is only fed by gases produced by the separation unit.

9. A method for separating a synthesis gas containing carbon monoxide and hydrogen, the method comprising the steps of:
i) compressing a synthesis gas flow originating from a synthesis gas source in a compressor;
ii) purifying the compressed synthesis gas in a purification unit to remove water and/or carbon dioxide;

iii) cooling the compressed purified synthesis gas flow;
iv) separating the cooled synthesis gas flow in a separation unit by a separation process selected from the group consisting of scrubbing distillation at a cryogenic temperature, adsorption, and combinations thereof;
v) producing at least the following three gases in the separation unit; a carbon monoxide-enriched gas, a hydrogen-enriched gas, a residual gas containing carbon monoxide and hydrogen which contains less carbon monoxide than the carbon monoxide-enriched gas and less hydrogen than the hydrogen-enriched gas, and
vi) determining that the synthesis gas flow passed to the compressor is below a threshold or zero, and then introducing at least a portion of at least two the gases selected from the group consisting of the carbon monoxide-enriched gas, the hydrogen-enriched gas, the residual gas, and combinations thereof, at a location downstream of the source and upstream of the purification unit,
wherein the carbon monoxide-enriched gas is compressed in a product compressor and passed to the customer and, if the flow of synthesis gas is below the threshold and the carbon monoxide-enriched gas flow which has to be compressed is below another threshold, nitrogen gas is passed to the product compressor to be compressed with the carbon monoxide-enriched gas.

10. The method as claimed in claim 1, wherein if the flow of synthesis gas is below a second threshold, a gas rich in a component originating from a source other than the separation unit is passed upstream or downstream of the compressor and upstream of the separation unit.

11. A method for separating a synthesis gas containing carbon monoxide and hydrogen, the method comprising the steps of:
i) compressing a synthesis gas flow originating from a synthesis gas source in a compressor;
ii) purifying the compressed synthesis gas in a purification unit to remove water and/or carbon dioxide;
iii) cooling the compressed purified synthesis gas flow;
iv) separating the cooled synthesis gas flow in a separation unit by a separation process selected from the group consisting of scrubbing, distillation at a cryogenic temperature, adsorption, and combinations thereof;
v) producing at least the following three gases in the separation unit: a carbon monoxide-enriched gas, a hydrogen-enriched gas, a residual gas containing carbon monoxide and hydrogen which contains less carbon monoxide than the carbon monoxide-enriched gas and less hydrogen than the hydrogen-enriched gas, and
vi) determining that the synthesis gas flow passed to the compressor is below a threshold or zero, and then introducing at least a portion of at least two the gases selected from the group consisting of the carbon monoxide-enriched gas, the hydrogen-enriched gas, the residual gas, and combinations thereof, at a location downstream of the source and upstream of the purification unit,
wherein the carbon monoxide-enriched gas is compressed in a product compressor, then divided into two, a compressed portion serving as product and a compressed portion being recycled downstream of the source and/or the hydrogen-enriched gas is compressed in a product compressor, then divided into two, a compressed portion serving as product and a compressed portion being recycled downstream of the source.

12. The method as claimed in claim 1, wherein step v) also produces a methane-enriched gas, and/or a nitrogen-enriched gas.

* * * * *